US012311403B1

(12) United States Patent
Blaylock et al.

(10) Patent No.: US 12,311,403 B1
(45) Date of Patent: May 27, 2025

(54) DRILL POWERED CAULKING GUN

(71) Applicant: TEMCo Industrial, LLC, Brenham, TX (US)

(72) Inventors: Bryan C. Blaylock, Brenham, TX (US); Brian Moreland, Brenham, TX (US); Josh L. Leber, San Jose, CA (US)

(73) Assignee: TEMCo INDUSTRIAL, LLC, Brenham, TX (US)

( * ) Notice: Subject to any disclaimer, the term of this patent is extended or adjusted under 35 U.S.C. 154(b) by 0 days.

(21) Appl. No.: 18/948,767

(22) Filed: Nov. 15, 2024

(51) Int. Cl.
*B05C 17/01* (2006.01)

(52) U.S. Cl.
CPC ...... *B05C 17/0103* (2013.01); *B05C 17/0133* (2013.01)

(58) Field of Classification Search
CPC ........................ B05C 17/0103; B05C 17/0133
USPC .......................................................... 222/326
See application file for complete search history.

(56) References Cited

U.S. PATENT DOCUMENTS

| | | | | | |
|---|---|---|---|---|---|
| 3,913,799 | A * | 10/1975 | Davis, Jr. | B05C 17/0103 | 222/326 |
| 4,260,076 | A * | 4/1981 | Bergman | B63B 5/065 | 222/327 |
| 4,322,022 | A * | 3/1982 | Bergman | B05C 17/0103 | 74/424.78 |
| 5,076,473 | A | 12/1991 | Steiner | | |
| 10,780,455 | B1 | 9/2020 | Heilbruner | | |
| 2009/0272767 | A1 * | 11/2009 | Herman | B05C 17/00576 | 222/326 |

* cited by examiner

*Primary Examiner* — Jeremy Carroll
(74) *Attorney, Agent, or Firm* — Donald J. Ersler

(57) ABSTRACT

A drill powered caulking gun preferably includes a cartridge holder, a lead screw, a lead screw nut, a thrust bearing, a washer and a plunger. The cartridge holder preferably includes a front end cap, a cartridge support member and a rear end cap. The lead screw preferably includes a threaded diameter, a hex drive member, a thrust bearing shoulder and a threaded end. The threaded diameter includes a fine thread. The lead screw nut includes a retention flange, a D-shaped portion and a threaded body. The lead screw nut is inserted through a D-shaped opening in the rear end cap. The lead screw nut is retained in the rear end cap with a jam nut. The plunger, thrust bearing and washer are rotatably retained on the threaded end with a lock nut. The plunger is used to push a diaphragm in the caulking cartridge to dispense caulk through a nozzle.

18 Claims, 6 Drawing Sheets

DRILL POWERED CAULKING GUN

BACKGROUND OF THE INVENTION

1. Field of the Invention

The present invention relates generally to hand tools and more specifically to a drill powered caulking gun, which requires less physical effort to operate than that of the prior art.

2. Discussion of the Prior Art

U.S. Pat. No. 5,076,473 to Steiner discloses a power caulking gun. U.S. Pat. No. 10,780,455 to Heilbruner discloses a caulking gun. Heilbrunner discloses using a ball bearing as a plunger. A ball bearing is not suitable for use as a thrust bearing. Further, Heilbrunner discloses using straps instead of a rigid member to connect front and rear end plates to retain a caulking cartridge. However, it appears that the prior art does not teach or suggest a drill powered caulking gun, which includes a lead screw and a removable nut with fine pitch threads; a thrust bearing and a washer; and an easy to load and remove caulking gun cartridge holder.

Accordingly, there is a clearly felt need in the art for a drill powered caulking gun, which includes a lead screw and a removable nut with fine pitch threads; a thrust bearing and a washer; an easy to load and remove caulking gun cartridge holder; requires less physical effort to operate than that of the prior art and is more economical to manufacture than that of the prior art.

SUMMARY OF THE INVENTION

The present invention provides a drill powered caulking gun, which is more economical to manufacture than that of the prior art. The drill powered caulking gun preferably includes a cartridge holder, a lead screw, a lead screw nut, a thrust bearing and a plunger. The cartridge holder preferably includes a front end cap, a cartridge support member and a rear end cap. The front end cap includes a front plate and a front attachment flange. The front attachment flange extends from a rear of the front plate. A substantially U-shaped slot is formed in a top of the front plate to provide clearance for a caulk dispensing nozzle of a caulking cartridge. The cartridge support member includes a semi-circular cross section, which is sized to receive an outer diameter of a caulking cartridge. The rear end cap includes a rear plate and a rear attachment flange. The rear attachment flange extends from a front of the rear plate. A D-shaped opening is preferably formed through the rear plate to receive the lead screw nut. An inner perimeter of the front attachment flange and the rear attached flange are sized to receive an outer perimeter of the cartridge support member. The front and rear end caps are attached to front and rear ends of the cartridge support member with any suitable attachment method, such as welding, rivets, fasteners or the like. The cartridge support member provides a rigid connection between the front and rear end caps. The front end cap, the rear end cap and the cartridge support member are preferably formed from stamped metal, but other materials and processes may also be used.

The lead screw preferably includes a threaded diameter, a hex drive member, a thrust bearing shoulder and a threaded end. The hex drive member extends from a rear end of the threaded diameter and the thrust bearing shoulder is formed on a front end of the threaded diameter. The threaded end terminates an end of the thrust bearing shoulder. The lead screw preferably has a fine thread, which is at least 24 threads per inch, at least 28 threads per inch, or at least 32 threads per inch, or at least 40 threads per inch. The lead screw nut includes a retention flange, a D-shaped portion and a threaded body. The flange extends from one end of the D-shaped portion and the threaded body extends from an opposing side of the D-shaped portion. The lead screw nut is inserted through the D-shaped opening in the rear end cap. The lead screw nut is retained in the rear end cap with a jam nut.

The thrust bearing includes a bearing hole, which is sized to receive the threaded end. The washer includes a washer hole, which sized to receive the threaded end. The plunger is used to push a diaphragm in the caulking cartridge to dispense caulk through a caulk dispensing nozzle. The plunger includes an outer diameter and a plunger hole. The outer diameter is sized to be received by an inner diameter of a caulking cartridge. The plunger hole is sized to receive the threaded end. The plunger, thrust bearing and washer are preferably retained on the threaded end with a nylon lock nut, or any other suitable device. The nylon lock nut is tightened, such that the plunger, thrust bearing and washer may rotate relative to the threaded diameter.

Rotation of the lead screw tends to cause the cartridge holder to rotate. The thrust bearing and washer reduce the amount of friction between the plunger and the lead screw. Reduced friction results in less human arm strength being required to prevent the cartridge holder from rotating and torque load on the drill. The fine thread increases the number of rotations of the lead screw, while decreasing the linear movement of the plunger to dispense caulk a manageable rate. Both human arms require less physical strength to operate the drill powered caulking gun, thus less physical fatigue to operate the drill powered caulking gun.

The drill powered caulking gun preferably operates in the following manner. The lead screw is rotated to move the plunger against the rear end cap. A caulking cartridge is inserted into the cartridge holder. The lead screw is rotated until it is snug against the diaphragm of the caulking cartridge. The drill is actuated to causes the diaphragm to move forward in the caulk cartridge to dispense caulk.

Accordingly, it is an object of the present invention to provide a drill powered caulking gun, which includes a lead screw and a removable nut with fine pitch threads.

It is further object of the present invention to provide a drill powered caulking gun, which includes a thrust bearing and washer to reduce friction and reduce physical fatigue to the operator.

It is another object of the present invention to provide a drill powered caulking gun, which allows a caulking cartridge to be easily loaded into and unloaded from a cartridge holder.

Finally, it is another object of the present invention to provide a drill powered caulking gun, which is more economical to manufacture than that of the prior art.

These and additional objects, advantages, features and benefits of the present invention will become apparent from the following specification.

DETAILED DESCRIPTION OF THE PREFERRED EMBODIMENTS

Figure 1:
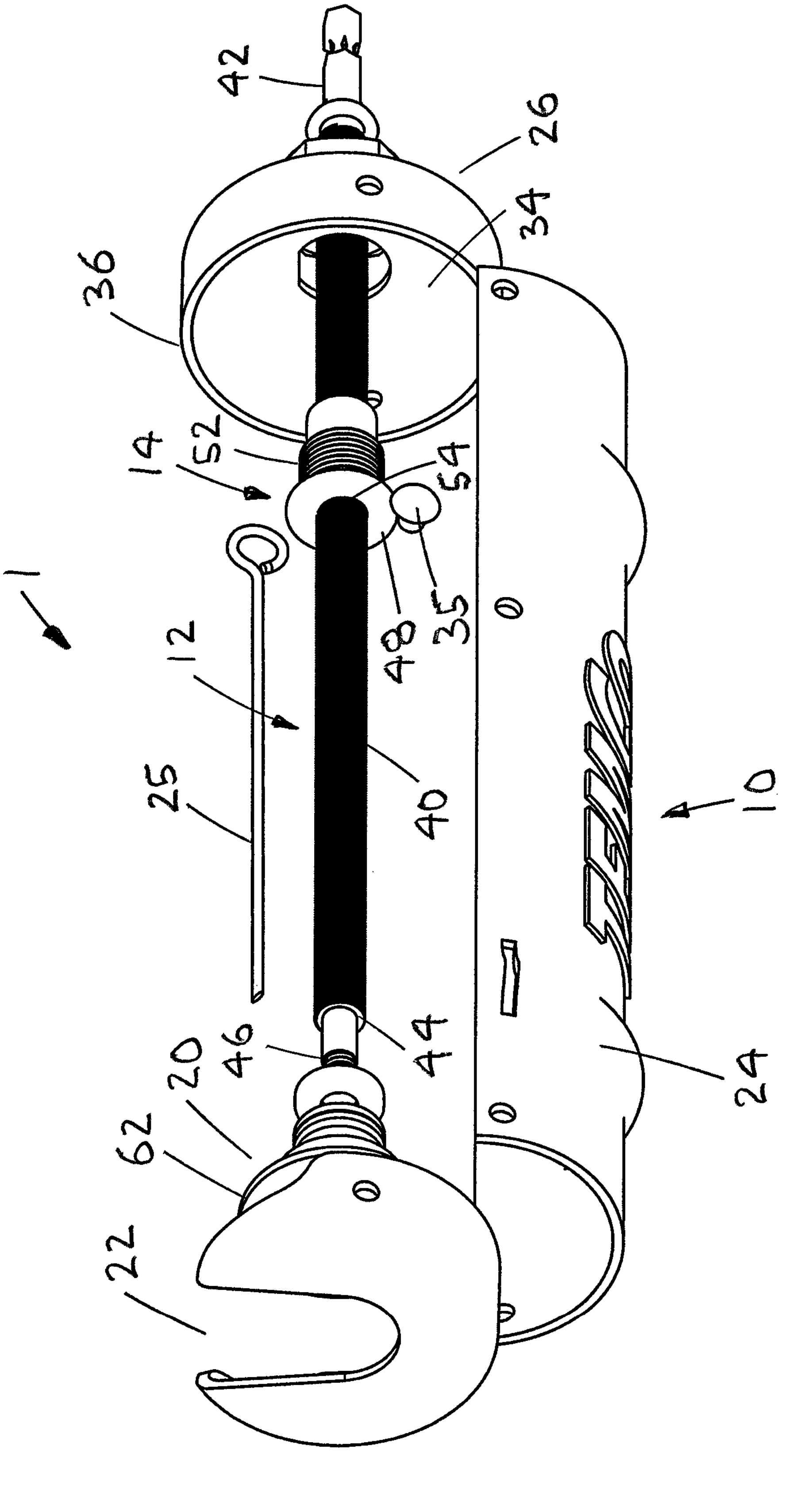
FIG. 1 is a front exploded perspective view of a drill powered caulking gun in accordance with the present invention.
Figure 2:
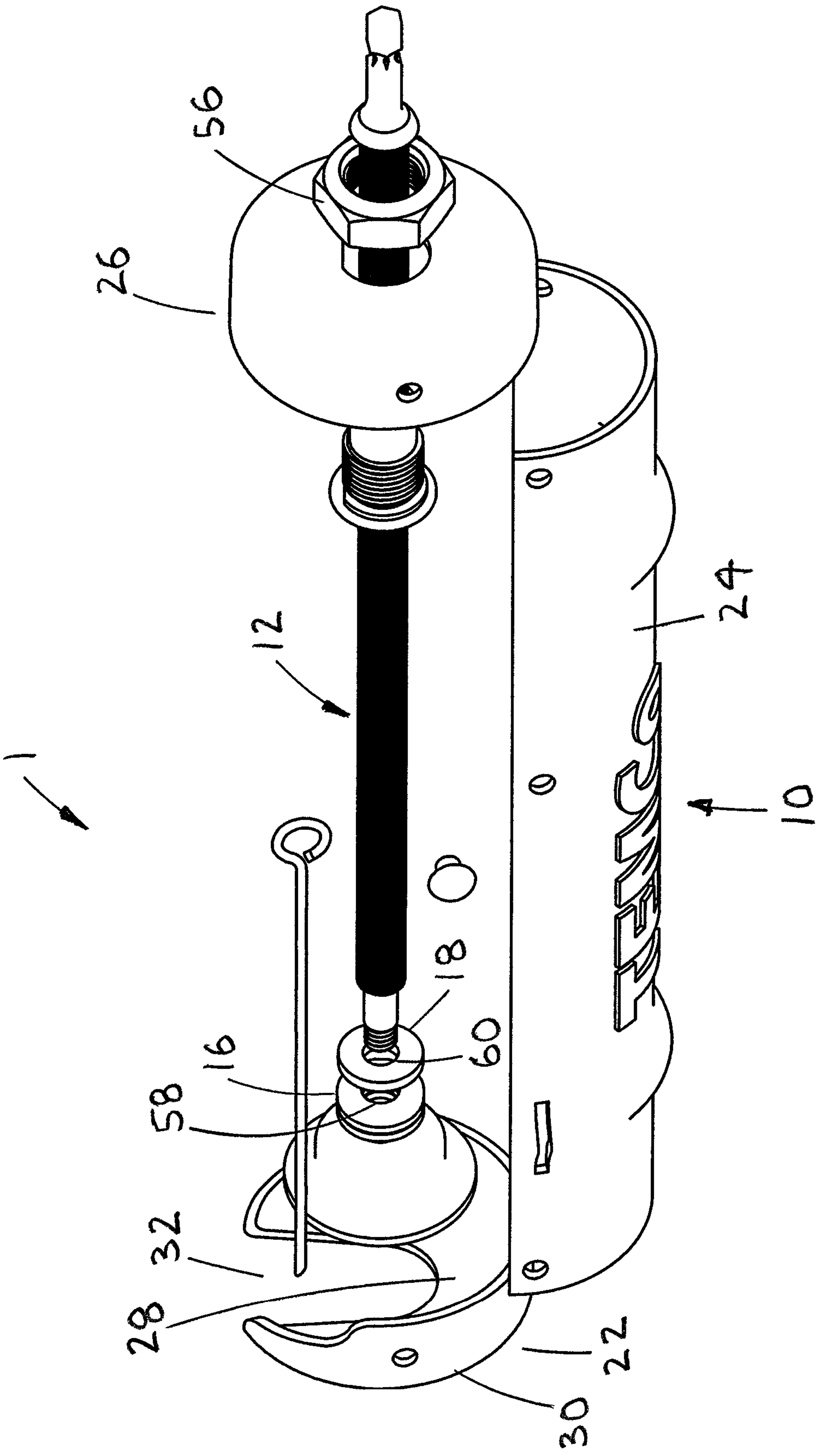
FIG. 2 is a rear exploded perspective view of a drill powered caulking gun in accordance with the present invention.
Figure 3:
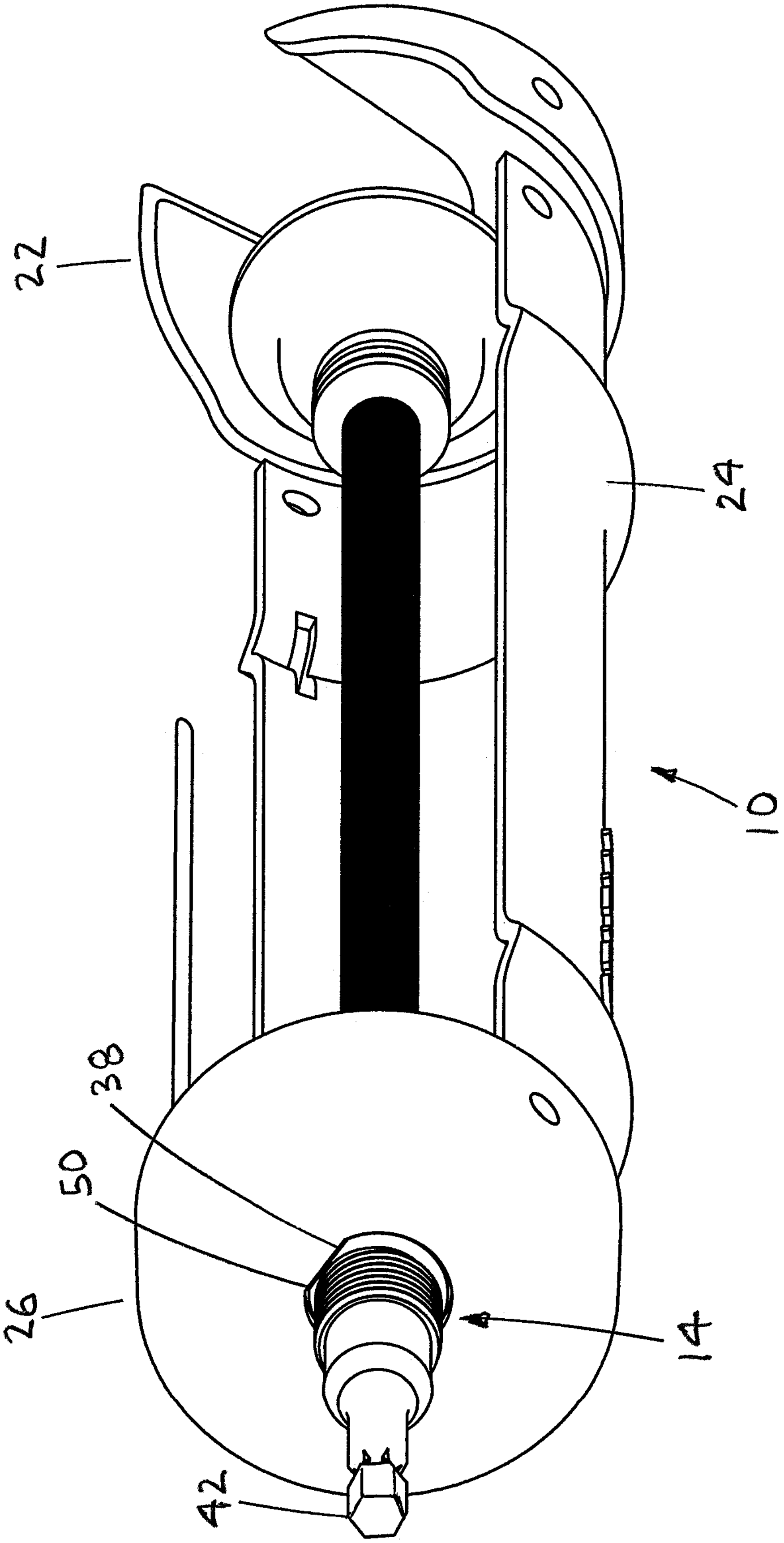
FIG. 3 is a front perspective view of a drill powered caulking gun in accordance with the present invention.
Figure 4:
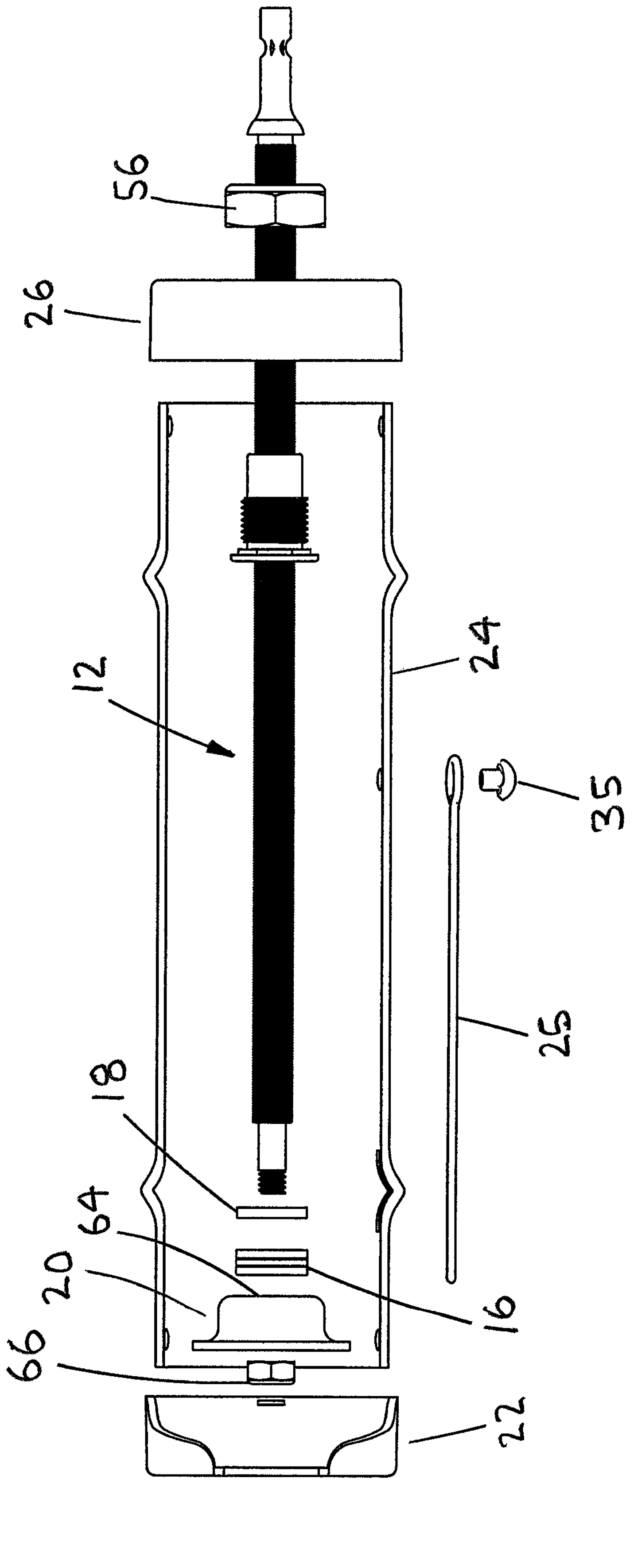
FIG. 4 is a top exploded view of a drill powered caulking gun in accordance with the present invention.
Figure 5:
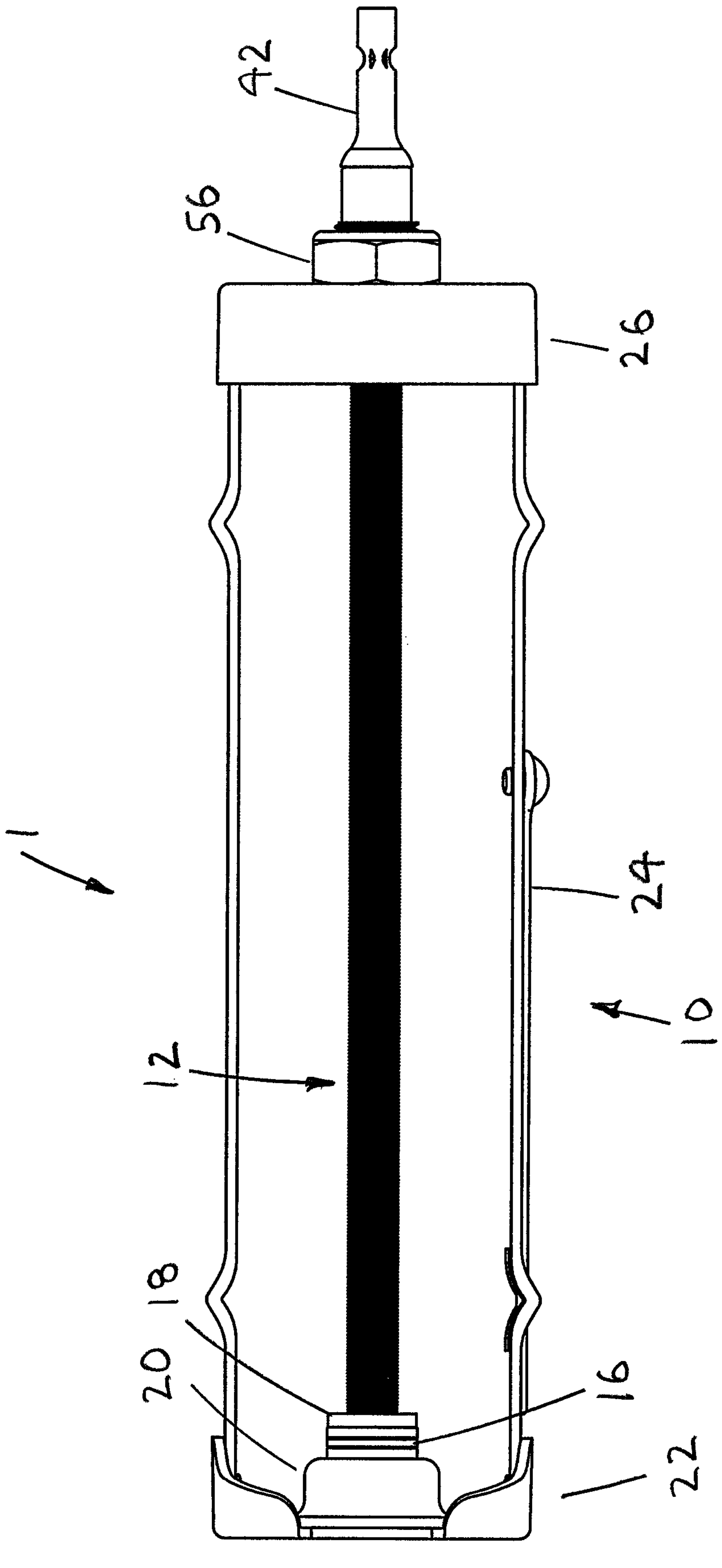
FIG. 5 is a top view of a drill powered caulking gun in accordance with the present invention.
Figure 6:
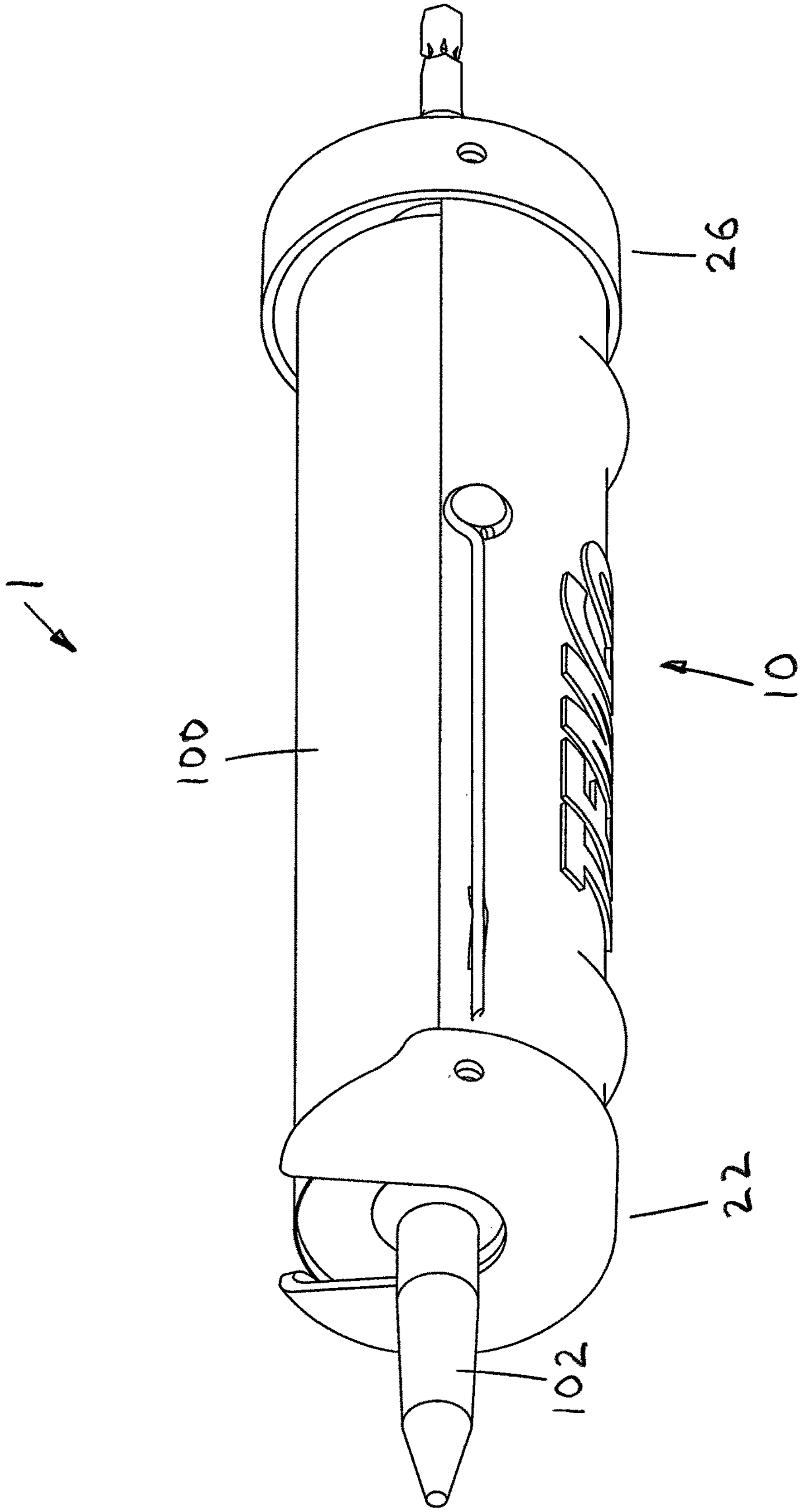
FIG. 6 is a perspective view of a drill powered caulking gun with a caulking cartridge inserted therein in accordance with the present invention.

With reference now to the drawings, and particularly to FIG. 1, there is shown a drill powered caulking gun 1. With reference to FIGS. 2-6, the drill powered caulking gun 1 preferably includes a cartridge holder 10, a lead screw 12, a lead screw nut 14, a thrust bearing 16, a washer 18 and a plunger 20. The cartridge holder 10 preferably includes a front end cap 22, a cartridge support member 24 and a rear end cap 26. The front end cap 22 includes a front plate 28 and an front attachment flange 30. The front attachment flange 30 extends from a rear of the front plate 28. A substantially U-shaped slot 32 is formed in a top of the front plate 28 to provide clearance for a caulk dispensing nozzle 102 of a caulking cartridge 100. The cartridge support member 24 includes a semi-circular cross section, which is sized to receive an outer diameter of the caulking cartridge 100. The rear end cap 26 includes a rear plate 34 and a rear attachment flange 36. The rear attachment flange 36 extends from a front of the rear plate 34. With reference to FIG. 3, a D-shaped opening 38 is formed through the rear plate 34 to receive the lead screw nut 12. An inner perimeter of the front attachment flange 30 and the rear attached flange 36 are sized to receive an outer perimeter of the cartridge support member 24. The front and rear end caps 22, 26 are attached to front and rear ends of the cartridge support member 24 with any suitable attachment method, such as welding, rivets, fasteners or the like. With reference to FIG. 6, a caulking wire 25 is pivotally attached to the cartridge support member 24 with a rivet 35. The front end cap 22, the rear end cap 26 and the cartridge support member 24 are preferably formed from stamped metal. The caulking wire 25 may be used to pierce an end of the caulk dispensing nozzle 102 or poke into hardened caulk in the caulk dispensing nozzle 102.

The lead screw 12 preferably includes a threaded diameter 40, a hex drive member 42, a thrust bearing shoulder 44 and a threaded end 46. The hex drive member 42 extends from a rear end of the threaded diameter 40 and the thrust bearing shoulder is formed on a front of the threaded diameter 40. The threaded end 46 terminates an end of the thrust bearing shoulder 44. The threaded diameter 40 preferably has a fine thread, which is at least 24 threads per inch, at least 28 threads per inch, at least 32 threads per inch, or at least 40 threads per inch. The diameter of the threaded diameter 40 is preferably at least 3/16 inch (#10). Examples of unified nation fine (UNF) threads are 1/4—28, 5/16—24 and 3/8—24. With reference to FIG. 3, the lead screw nut 14 preferably includes a retention flange 48, a D-shaped portion 50, a threaded body 52 and an internal female thread 54. The retention flange 48 extends from one end of the D-shaped portion 50 and the threaded body 52 extends from an opposing end of the D-shaped portion 50. The lead screw nut 14 is inserted through the D-shaped opening 38 in the rear end cap 26. The D-shaped opening 38 and D-shaped portion 50 prevent the lead screw nut 14 from rotating relative to the rear end cap 26. With reference to FIG. 2, the lead screw nut 14 is retained in the rear end cap 26 with a jam nut 56.

With reference to FIGS. 2 and 6, the thrust bearing 16 includes a hole 58, which sized to receive the threaded end 46. The washer 18 includes a washer hole 60, which sized to receive the threaded end 46. The plunger 20 is used to push a diaphragm (not shown) in the caulking cartridge 100 to dispense caulk through the caulk dispensing nozzle 102. The plunger 20 includes an outer diameter 62 and a plunger hole 64. The outer diameter 62 is sized to be received by an inner diameter of a caulking cartridge 100. The plunger hole 64 is sized to receive the threaded end 46. The plunger 20, thrust bearing 16 and washer 18 are preferably retained on the threaded end 46 with a nylon lock nut 66, or any other suitable device. The nylon lock nut 66 is tightened, such that the plunger 20, thrust bearing 16 and washer 18 rotate relative to the lead screw 12.

The rotation of the lead screw 12 by a drill (not shown) tends to cause the cartridge holder 10 to rotate. The thrust bearing 16 and the washer 18 reduce the amount of friction between the plunger 20 and the lead screw 12. Reduced friction results in less human arm strength required to prevent the cartridge holder 10 from rotating and torque load on the drill. The fine threads of the threaded diameter 40 increase the number of rotations of the lead screw 12, while decreasing the linear movement of the plunger 20 to dispense less caulk. Both human arms require less physical strength exerted to operate the drill powered caulking gun 1, which results in less physical fatigue to operate the drill powered caulking gun 1.

The drill powered caulking gun 1 preferably operates in the following manner. The lead screw 12 is rotated to move the plunger 20 against the rear end cap 26. A caulking cartridge 100 is inserted into the cartridge holder 10. The lead screw 12 is rotated in the opposite direction, until it is snug against the diaphragm of the caulking cartridge 100. The drill is actuated to cause the diaphragm to move forward in the caulking cartridge 100 to dispense caulk.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A drill powered caulking gun for retaining a caulking cartridge, the caulking cartridge includes a diaphragm for dispensing caulk, comprising:

- a cartridge holder includes a first end and a second, a space between said first end and said second end is sized to axially retain the caulking cartridge;
- a lead screw includes one end threadably retained in said first end of said cartridge holder, wherein said one end of said lead screw is capable of being directly retained by a chuck of the drill, said lead screw and the chuck are located on the same centerline;
- a plunger is rotatably retained on an opposing end of said lead screw, wherein said plunger pushes the diaphragm to dispense caulk; and
- a thrust washer is located behind said plunger.

2. The drill powered caulking gun for retaining a caulking cartridge of claim 1, wherein:

said cartridge holder includes a front end cap, a cartridge support member and a rear end cap, said front end cap is secured to a front end of said cartridge support member, said rear end cap is secured to a rear end of said cartridge support member.

3. The drill powered caulking gun for retaining a caulking cartridge of claim 2, wherein:

said front end cap includes a U-shaped slot to provide clearance for a caulk dispensing nozzle of the caulking cartridge.

4. The drill powered caulking gun for retaining a caulking cartridge of claim 1, wherein:

said lead screw includes said threaded diameter, a hex drive member, a thrust bearing shoulder and a threaded end, said hex drive member extends from said one end of said threaded diameter, said thrust bearing shoulder extends from an opposing end of said threaded diameter, said threaded end terminates an end of said thrust bearing shoulder.

5. The drill powered caulking gun for retaining a caulking cartridge of claim 4, further comprising:

a lock nut is threaded on to said threaded end to rotatably retain said plunger and said thrust washer.

6. The drill powered caulking gun for retaining a caulking cartridge of claim 2, further comprising:

a screw nut is removably retained in said rear end cap, with a jam nut, said screw nut includes internal threads which are sized to threadably receive said threaded diameter of said lead screw.

7. A drill powered caulking gun for retaining a caulking cartridge, the caulking cartridge includes a diaphragm for dispensing caulk through a caulk dispensing nozzle, comprising:

a cartridge holder includes a first end and a second, a space between said first end and said second end axially retains the caulk cartridge, the caulk dispensing nozzle extends past said first end;

a lead screw includes one end threadably retained in said second end of said cartridge holder, said lead screw includes a threaded diameter with a thread count per inch of at least 24, wherein said one end of said lead screw is capable of being directly retained by a chuck of the drill, said lead screw and the chuck are located on the same centerline;

a plunger is rotatably retained on an opposing end of said lead screw, wherein said plunger is sized to push the diaphragm; and a thrust washer is located behind said plunger.

8. The drill powered caulking gun for retaining a caulking cartridge of claim 7, wherein:

said cartridge holder includes a front end cap, a cartridge support member and a rear end cap, said front end cap is secured to a front end of said cartridge support member, said rear end cap is secured to a rear end of said cartridge support member.

9. The drill powered caulking gun for retaining a caulking cartridge of claim 8, wherein:

said front end cap includes a U-shaped slot to provide clearance for the caulk dispensing nozzle of the caulking cartridge.

10. The drill powered caulking gun for retaining a caulking cartridge of claim 7, wherein:

said lead screw includes said threaded diameter, a hex drive member, a thrust bearing shoulder and a threaded end, said hex drive member extends from said one end of said threaded diameter, said thrust bearing shoulder extends from an opposing end of said threaded diameter, said threaded end terminates an end of said thrust bearing shoulder.

11. The drill powered caulking gun for retaining a caulking cartridge of claim 10, further comprising:

a lock nut is threaded on to said threaded end to rotatably retain said plunger and said thrust washer.

12. The drill powered caulking gun for retaining a caulking cartridge of claim 8, further comprising:

a screw nut is removably retained in said rear end cap, with a jam nut, said screw nut includes internal threads which are sized to threadably receive said threaded diameter of said lead screw.

13. A drill powered caulking gun for retaining a caulking cartridge, the caulking cartridge includes a diaphragm for dispensing caulk through a caulk dispensing nozzle, comprising:

a cartridge holder includes a first end and a second, a space between said first end and said second end axially retains the caulking cartridge, the caulk dispensing nozzle extends past said first end;

a lead screw includes one end threadably retained in said second end, said lead screw includes a threaded diameter with a thread count per inch of at least 24, wherein said one end of said lead screw is capable of being directly retained by a chuck of the drill, said lead screw and the chuck are located on the same centerline;

a plunger is rotatably retained on an opposing end of said lead screw, wherein said plunger is sized to push the diaphragm;

a thrust washer is located behind said plunger; and a washer is located behind said thrust washer.

14. The drill powered caulking gun for retaining a caulking cartridge of claim 13, wherein:

said cartridge holder includes a front end cap, a cartridge support member and a rear end cap, said front end cap is secured to a front end of said cartridge support member, said rear end cap is secured to a rear end of said cartridge support member.

15. The drill powered caulking gun for retaining a caulking cartridge of claim 14, wherein:

said front end cap includes a U-shaped slot to provide clearance for a caulk dispensing nozzle of the caulking cartridge.

16. The drill powered caulking gun for retaining a caulking cartridge of claim 13, wherein:

said lead screw includes said threaded diameter, a hex drive member, a thrust bearing shoulder and a threaded end, said hex drive member extends from said one end of said threaded diameter, said thrust bearing shoulder is located on an opposing end of said threaded diameter, said threaded end terminates an end of said thrust bearing shoulder.

17. The drill powered caulking gun for retaining a caulking cartridge of claim 16, further comprising:

a lock nut is threaded on to said threaded end to rotatably retain said plunger and said thrust washer.

18. The drill powered caulking gun for retaining a caulking cartridge of claim 14, further comprising:

a screw nut is removably retained in said rear end cap, with a jam nut, said screw nut includes internal threads which are sized to threadably receive said threaded diameter of said lead screw.

* * * * *